US010428459B2

(12) United States Patent
Luo

(10) Patent No.: US 10,428,459 B2
(45) Date of Patent: *Oct. 1, 2019

(54) CROSSLINKED CELLULOSE AS PRECURSOR IN PRODUCTION OF HIGH-GRADE CELLULOSE DERIVATIVES AND RELATED TECHNOLOGY

(71) Applicant: INTERNATIONAL PAPER COMPANY, Memphis, TN (US)

(72) Inventor: Mengkui Luo, Auburn, WA (US)

(73) Assignee: INTERNATIONAL PAPER COMPANY, Memphis, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/909,848

(22) Filed: Mar. 1, 2018

(65) Prior Publication Data

US 2018/0187372 A1  Jul. 5, 2018

Related U.S. Application Data

(63) Continuation of application No. 15/067,760, filed on Mar. 11, 2016, now Pat. No. 9,926,665.

(Continued)

(51) Int. Cl.
*D21C 9/00* (2006.01)
*D21C 9/18* (2006.01)
(Continued)

(52) U.S. Cl.
CPC .............. *D21H 11/04* (2013.01); *C08B 15/10* (2013.01); *C08H 8/00* (2013.01); *C08L 97/02* (2013.01);
(Continued)

(58) Field of Classification Search
CPC ........ D21C 9/002; D21C 9/005; D21C 9/163; D21C 9/001; D21H 11/20; D21H 11/16;
(Continued)

(56) References Cited

U.S. PATENT DOCUMENTS 3,658,613 A    4/1972  Steiger
4,295,925 A   10/1981  Bentvelzen et al.
(Continued)

FOREIGN PATENT DOCUMENTS

CA    2529274 A1 *  6/2006   ............. A61L 15/28
EP    0399564 B2     5/1990
(Continued)

OTHER PUBLICATIONS

International Search Report and Written Opinion dated Aug. 10, 2017, in corresponding International Application No. PCT/US2017/019457, filed Feb. 24, 2017, 13 pages.

(Continued)

*Primary Examiner* — Jose A Fortuna
(74) *Attorney, Agent, or Firm* — Christensen O'Connor Johnson Kindness PLLC

(57) ABSTRACT

A pulp in accordance with a particular embodiment includes crosslinked cellulose fibers. The pulp can have high brightness, reactivity, and intrinsic viscosity. The pulp, therefore, can be well suited for use as a precursor in the production of low-color, high-viscosity cellulose derivatives. A method in accordance with a particular embodiment of the present technology includes forming a pulp from a cellulosic feedstock, bleaching the pulp, crosslinking cellulose fibers within the pulp while the pulp has a high consistency, and drying the pulp. The bleaching process can reduce a lignin content of the pulp to less than or equal to 0.09% by oven-dried weight of the crosslinked cellulose fibers. Crosslinking the cellulose fibers can include exposing the cellulose fibers to a glycidyl ether crosslinker having two or more glycidyl groups and a molecular weight per epoxide within a range from 140 to 175.

13 Claims, 1 Drawing Sheet

Related U.S. Application Data

(60) Provisional application No. 62/299,894, filed on Feb. 25, 2016.

(51) Int. Cl.
| | | |
|---|---|---|
| *D21C 9/147* | (2006.01) | |
| *D21H 13/04* | (2006.01) | |
| *D21H 11/04* | (2006.01) | |
| *D21C 9/10* | (2006.01) | |
| *C08B 15/10* | (2006.01) | |
| *C08H 8/00* | (2010.01) | |
| *C08L 97/02* | (2006.01) | |
| *D21H 11/14* | (2006.01) | |

(52) U.S. Cl.
CPC ........... *D21C 9/005* (2013.01); *D21C 9/1063* (2013.01); *D21C 9/147* (2013.01); *D21C 9/18* (2013.01); *D21H 11/14* (2013.01); *D21H 13/04* (2013.01); *C08L 2312/00* (2013.01)

(58) Field of Classification Search
CPC .......... D21H 17/06; D21H 17/53; C08L 1/02; C08L 1/00; C08L 1/26; D06M 13/148; D06M 13/207; D06M 2101/06; D06M 23/00; D04H 1/425; C08B 15/10
See application file for complete search history.

(56) References Cited

U.S. PATENT DOCUMENTS

| | | | |
|---|---|---|---|
| 4,295,926 | A | 10/1981 | Bentvelzen et al. |
| 4,295,927 | A | 10/1981 | Bentvelzen et al. |
| 4,298,426 | A | 11/1981 | Torregrossa et al. |
| 5,384,012 | A | 1/1995 | Hazard, Jr. |
| 5,779,857 | A | 7/1998 | Norlander |
| 6,176,973 | B1 | 1/2001 | Norlander |
| 6,685,856 | B2 | 2/2004 | Sealey, II et al. |
| 7,541,396 | B2 | 6/2009 | Luo et al. |
| 7,604,714 | B2 | 10/2009 | Luo et al. |
| 8,039,683 | B2 | 10/2011 | Qin et al. |
| 8,722,797 | B2 | 5/2014 | Stoyanov et al. |
| 8,845,757 | B2 * | 9/2014 | Weinstein ........... D06M 13/203 8/116.1 |
| 9,926,665 | B2 * | 3/2018 | Luo ........................ D21H 13/04 |
| 2002/0088581 | A1 | 7/2002 | Graef et al. |
| 2004/0074616 | A1 | 4/2004 | Sears et al. |
| 2005/0223501 | A1 | 10/2005 | Stoyanov et al. |
| 2006/0118255 | A1 | 6/2006 | Sears et al. |
| 2006/0142480 | A1 * | 6/2006 | Luo ........................ A61L 15/28 525/54.2 |
| 2006/0142481 | A1 * | 6/2006 | Herriott ................. C08B 11/20 525/54.2 |
| 2006/0142561 | A1 * | 6/2006 | Luo ........................ A61L 15/28 536/97 |
| 2008/0082064 | A1 | 4/2008 | Luo et al. |
| 2008/0082068 | A1 | 4/2008 | Qin et al. |
| 2008/0147032 | A1 | 6/2008 | Luo et al. |
| 2008/0147033 | A1 | 6/2008 | Luo et al. |
| 2009/0099541 | A1 | 4/2009 | Qin et al. |
| 2009/0199349 | A1 * | 8/2009 | Weinstein ........... D06M 13/203 8/120 |
| 2010/0162542 | A1 | 6/2010 | Luo et al. |
| 2010/0167018 | A1 | 6/2010 | Luo et al. |
| 2011/0077354 | A1 | 3/2011 | Stoyanov et al. |
| 2017/0247833 | A1 * | 8/2017 | Lou ........................ D21H 13/04 |
| 2018/0187372 | A1 * | 7/2018 | Luo ........................ D21H 13/04 |

FOREIGN PATENT DOCUMENTS

| | | | | |
|---|---|---|---|---|
| EP | 1 676 865 | A1 | 7/2006 | |
| EP | 1676865 | A1 * | 7/2006 | ............ A61L 15/28 |
| WO | 98/30387 | A1 | 7/1997 | |
| WO | 2005/035871 | A2 | 4/2005 | |
| WO | 2009/088635 | A2 | 7/2009 | |
| WO | 2015/165588 | A1 | 11/2015 | |
| WO | WO-2015165588 | A1 * | 11/2015 | ............ C08B 11/00 |
| WO | 2017/147496 | A1 | 8/2017 | |
| WO | WO-2017147496 | A1 * | 8/2017 | ............ D21H 13/04 |

OTHER PUBLICATIONS

Lionetto, F., et al., "Monitoring Wood Degradation During Weathering by Cellulose Crystallinity," Materials 5(10):1910-1922, Oct. 2012.

Nicholson, M.D., and F.M. Merrit, "Cellulose Ethers," in Nevell, T.P., and S. Zeronian (eds), "Cellulose Chemistry and its Applications," Halsted (Wiley), New York, 1985, pp. 363-383.

International Preliminary Report on Patentability dated Sep. 7, 2018, in corresponding International Application No. PCT/US2017/019457, filed Feb. 24, 2017, 8 pages.

Australian Office Action dated May 22, 2019, in Australian Application No. 2017223978, filed Feb. 24, 2017, 5 pages.

* cited by examiner

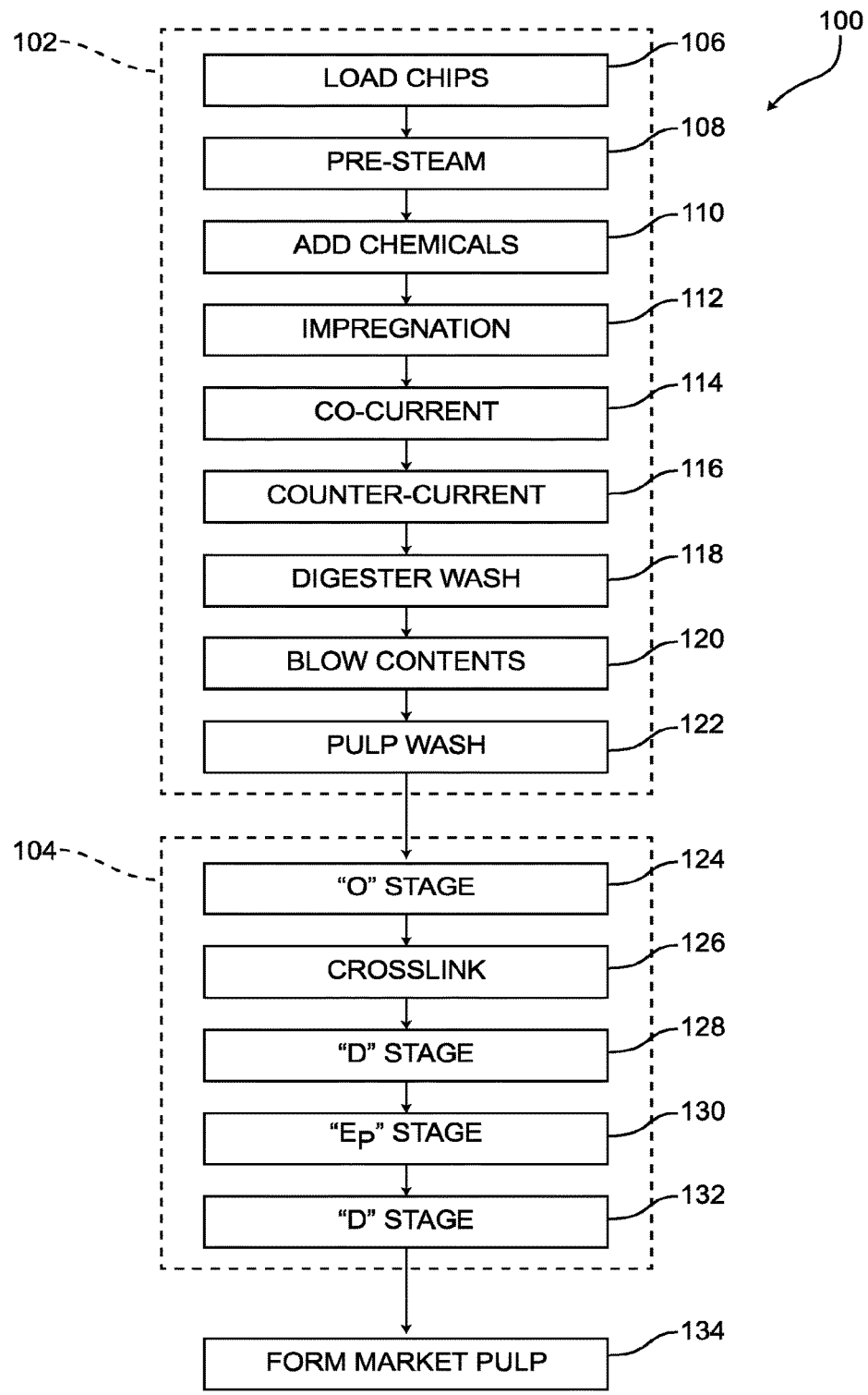

CROSSLINKED CELLULOSE AS PRECURSOR IN PRODUCTION OF HIGH-GRADE CELLULOSE DERIVATIVES AND RELATED TECHNOLOGY

CROSS-REFERENCE TO RELATED APPLICATION

This application is a continuation of U.S. patent application Ser. No. 15/067,760, filed Mar. 11, 2016, now U.S. Pat. No. 9,926,665, which claims the benefit of U.S. Provisional Application No. 62/299,894, filed Feb. 25, 2016, both of which are incorporated herein by reference in their entirety. To the extent the foregoing applications and/or any other materials incorporated herein by reference conflict with the present disclosure, the present disclosure controls.

TECHNICAL FIELD

The present technology is related to cellulose products (e.g., pulp) and cellulose derivatives (e.g., cellulose ethers).

BACKGROUND

Cellulose ethers (e.g., carboxymethyl cellulose, methyl cellulose, etc.) form aqueous solutions and are available in various grades depending, in large part, on the viscosity of these solutions. High-grade cellulose ethers that form more viscous aqueous solutions tend to be more valuable than lower grade cellulose ethers that form less viscous aqueous solutions. The capacity of a given cellulose ether to form a more viscous aqueous solution is closely related to the degree of polymerization and/or other properties of the cellulose precursor from which the given cellulose ether is produced. High-grade cellulose ether is conventionally produced from dissolving grade pulp (e.g., cotton linters pulp), while medium grade and low grade cellulose ether is conventionally produced from lower cost wood pulps. Pulp grades referenced in this disclosure are further discussed in Herbert Sixta, *Handbook of Pulp*, Wiley-Vch (2006), which is incorporated herein by reference in its entirety. The degree of polymerization of most wood pulps does not exceed about 1,500. In contrast, dissolving grade pulp often has a degree of polymerization of 2,400 or greater. Unfortunately, dissolving grade pulp tends to be expensive. Prior art attempts to modify low-cost pulps for production of high-grade cellulose derivatives have had only limited success. Accordingly, there is a need for further innovation in this field.

BRIEF DESCRIPTION OF THE DRAWING

Many aspects of the present technology can be better understood with reference to FIG. 1. FIG. 1 is a flow chart illustrating a method for making pulp in accordance with an embodiment of the present technology.

DETAILED DESCRIPTION

Methods for making pulp and related systems and compositions in accordance with embodiments of the present technology can at least partially address one or more problems associated with conventional technologies whether or not such problems are stated herein. For example, methods in accordance with at least some embodiments of the present technology allow low-cost pulp to serve as a precursor in the production of high-grade cellulose ethers and/or other cellulose derivatives (e.g., cellulose esters). Kraft pulp, for example, is far less expensive and more widely available than dissolving grade pulp. When standard Kraft pulp is used as a precursor for production of cellulose ethers, however, the resulting cellulose ethers tend to be low grade.

Desirable properties in a pulp for use in producing cellulose derivatives include high brightness and high viscosity. High brightness in a pulp can cause cellulose derivatives produced from the pulp to have little or no color. In many products made with cellulose derivatives (e.g., medical fabrics, foods, drywall, etc.), it is undesirable for the cellulose derivatives to impart color to the products. Similarly, in these and other applications, it tends to be useful for cellulose derivatives to have high viscosity while still remaining soluble in water. Accordingly, cellulose derivatives with little or no color and high viscosity tend to be more expensive than cellulose derivatives with significant color and low viscosity. High reactivity in a pulp increase the efficiency of functionalizing reactions (e.g., etherification) used to convert the pulp into cellulose derivatives. The reactivity of a pulp is closely related to the degree to which the surfaces of cellulose fibers in the pulp contact water molecules in which a functionalizing agent is distributed to the surfaces. Greater contact between these surfaces and water molecules also increases the degree to which pulp holds water. Accordingly, pulps with higher water retention values tend to also be pulps with higher reactivity.

Several conventional processes have, to some degree, been successful in increasing the capacity of Kraft pulp to produce cellulose ethers that form high viscosity aqueous solutions. Unfortunately, these conventional processes have invariably done so at the expense of other desirable properties in the cellulose ethers and/or at the expense of process yields. For example, some conventional processes include reducing or eliminating bleaching in the Kraft process. The pulps resulting from these processes tend to have high lignin contents and, correspondingly, low brightness. This leads to undesirable color in cellulose ethers produced from these pulps. As another example, some conventional processes include increasing removal of hemicellulose from Kraft pulp. These processes, however, have low yields due to removal of the bulk that hemicellulose provides. Moreover, the pulps resulting from these processes tend to have low reactivity due to conversion of constituent cellulose from cellulose-I to cellulose-II. Conventional crosslinking reactions also typically reduce the water retention value (and reactivity) of a pulp. Even allowing for low brightness, low yield, and/or low reactivity, conventional processes for modifying low-cost pulp have still not been able to produce pulp suitable for producing cellulose ethers that form aqueous solutions with viscosities as high as those of cellulose derivatives produced from high viscosity dissolving grade ether pulps.

Methods in accordance with at least some embodiments of the present technology include crosslinking pulp at relatively high consistency (e.g., consistency greater than or equal to 12%). These methods can further include crosslinking pulp with a crosslinker selected to increase the water retention value of the pulp. Crosslinkers well suited for this purpose include, for example, glycidyl ether crosslinker having two or more glycidyl groups and a molecular weight per epoxide within a range from 140 to 175. Crosslinking pulp at relatively high consistency and using this type of crosslinker has surprisingly been found to cause low-cost pulp (e.g., Kraft pulp) to become suitable for production of high-grade cellulose derivatives with little or no associated reduction in brightness, yield, reactivity, and/or other desirable pulp properties.

Conventional, non-crosslinked Kraft pulps tend to have lower reactivity than other chemical pulps, such as sulfite pulps (i.e., pulps made by extracting lignin from wood primarily using salts of sulfurous acid). In at least some embodiments of the present technology, however, crosslinked Kraft pulp has relatively high reactivity. Solely by way of theory and without wishing to be limited to such theory, this may be due to the presence of crosslinks that add extra space uniformly between cellulose chains. Longer chain crosslinkers (e.g., polyglycidyl ether) may produce crosslinked pulp with higher reactivity than shorter chain crosslinkers (e.g., 1,3-dichloro-2-hydroxypropanol (DCP)) under similar crosslinking conditions. Pulps crosslinked with longer chain crosslinkers may have crystallinity indexes lower than those of starting pulps and much lower than those of dissolving grade sulfite wood pulp and cotton linters pulp. Crosslinking Kraft pulp instead of sulfite pulp for high viscosity ether applications can be advantageous in at least some cases because Kraft is the dominant pulping process, has higher yield (higher hemicellulose content), lower cost and is more environmentally friendly than sulfite pulping processes.

In conventional Kraft processing, pulp is maintained at relatively low consistency (e.g., consistency less than or equal to 10%). As the consistency of pulp increases, it becomes more difficult to flow the pulp through pipes and to mix the pulp. Therefore, any crosslinking in conventional processes for modifying Kraft pulp to increase its potential for production of high-grade cellulose derivatives has also been carried out at relatively low consistency. One of the surprising discoveries associated with at least some embodiments of the present technology is that increasing the consistency of pulp during crosslinking can increase the water retention value of the crosslinked pulp. With this and/or other discoveries associated with at least some embodiments of the present technology, it is finally possible to produce Kraft pulp that is a true substitute for and/or a suitable extender of expensive dissolving grade pulp in production of high-grade cellulose derivatives.

Specific details of methods for making pulp and related systems and compositions in accordance with several embodiments of the present technology are described herein with reference to FIG. 1. Although the methods and related systems and compositions may be disclosed herein primarily or entirely in the context of modifying Kraft pulp for production of cellulose derivatives, other contexts in addition to those disclosed herein are within the scope of the present technology. For example, suitable features of described methods, systems, and compositions can be implemented in the context of sulfite pulp or even in the context of dissolving grade pulp. As another example, suitable features of described methods, systems, and compositions can be implemented in the context of modifying Kraft or other pulp for uses other than production of cellulose derivatives, such as production of specialty paper products.

It should understood, in general, that other methods, systems, and compositions in addition to those disclosed herein are within the scope of the present technology. For example, methods, systems, and compositions in accordance with embodiments of the present technology can have different and/or additional operations, components, configurations, etc. than those disclosed herein. Moreover, a person of ordinary skill in the art will understand that methods, systems, and compositions in accordance with embodiments of the present technology can be without certain operations, components, configurations, etc. disclosed herein without deviating from the present technology.

Test Methods and Acronyms

Ash Content: Determined by TAPPI T 211 om-07.

ASTM: American Society for Testing and Materials

Brightness: Determined by TAPPI T 525 om-12.

Capillary Viscosity: Determined by TAPPI T 230 om-99.

Carboxyl Content: Determined by TAPPI T 237 om-08.

Centrifugal Capacity: Determined by the corresponding method disclosed in U.S. Pat. No. 8,039,683, which is incorporated herein by reference in its entirety.

CMC: carboxymethyl cellulose

Coarseness: Determined by the corresponding method disclosed in U.S. Pat. No. 6,685,856, which is incorporated herein by reference in its entirety.

Crystallinity Index: Determined by the corresponding method of Lionetto et al., "Monitoring Wood Degradation during Weathering by Cellulose Crystallinity," Materials, 5, 1910-1922 (2012), which is incorporated herein by reference in its entirety.

Cuen Solubility: Solubility in cupriethylenediamine under the conditions of TAPPI T 254 cm-00.

Curl Index: Determined by the corresponding method disclosed in U.S. Pat. No. 6,685,856, which is incorporated herein by reference in its entirety.

Degree of Polymerization: The number of D-glucose monomers in a cellulose molecule as measured by ASTM-D1795-96. Average degree of polymerization refers to the average number of D-glucose molecules per cellulose polymer in a population of cellulose polymers.

Degree of Substitution (DS): Determined by ASTM D 1439-03.

DWP: dissolving wood pulp

Falling-Ball (FB) Viscosity: Determined by TAPPI T 254 cm-00.

Freeness: Canadian Standard Freeness as determined by TAPPI T 227 om-04.

Free Swell: Determined by the corresponding method disclosed in U.S. Pat. No. 8,039,683, which is incorporated herein by reference in its entirety.

Hemicellulose Content: The sum of mannan and xylan content as determined by the method described in Examples 6 and 7 of U.S. Pat. No. 7,541,396, which is incorporated herein by reference in its entirety. This test is based on TAPPI T 249 cm00 with analysis by Dionex ion chromatography.

HPLC: High Performance Liquid Chromatography

Intrinsic Viscosity (IV): Determined by ASTM D1795-96.

ISO: International Organization for Standardization

Kappa Number: Determined by ISO 302:2004.

Kink Angle: Determined by the corresponding method disclosed in U.S. Pat. No. 6,685,856, which is incorporated herein by reference in its entirety.

Kink Index: Determined by the corresponding method disclosed in U.S. Pat. No. 6,685,856, which is incorporated herein by reference in its entirety.

Lignin Content: Determined by the method described in Examples 6 and 7 of U.S. Pat. No. 7,541,396, which is incorporated herein by reference in its entirety.

MCA: monochloroacetic acid

NCASI: National Council for Air and Stream Improvement

Oven Dried (OD): Dried to less than or equal to 7% moisture by weight.

R18: Measured by TAPPI T 235 cm-00.

Resultant CMC Viscosity: Refers to the viscosity of a 0.5% solution of resultant CMC according to the Resultant CMC Testing Method below.

Resultant CMC Color: See Resultant CMC Testing Method below.

Resultant CMC Turbidity: See Resultant CMC Testing Method below.

TAPPI: Technical Association of the Pulp and Paper Industry

Transition Metal Content: Determined by EPA SW-856 method 3050, 200.8.

US EPA: United States Environmental Protection Agency

Water Retention Value (WRV): Determined by TAPPI T UM256M (2011).

Wet Bulk: Determined by the corresponding method disclosed in U.S. Pat. No. 8,722,797, which is incorporated herein by reference in its entirety.

WPE: weight per epoxide

Resultant CMC Testing Method

Throughout this disclosure, the properties of pulp may be characterized in terms of "resultant CMC" properties. These are properties of CMC that the pulp can be used to produce, with CMC serving as a representative example of a cellulose derivative. It should be understood that CMC is not the only cellulose derivative that pulps in accordance with embodiments of the present technology may be used to produce. Resultant CMC properties of a given pulp described herein are determined by the following procedure. Additional details regarding this procedure can be found in Nevell T. P. and Zeronian S., *Cellulose Chemistry and its Applications*, Chapter 15-Cellulose Ethers (1985), which is incorporated herein by reference in its entirety.

First, determine the degree of substitution of the pulp. If the degree of substitution of the pulp is at least 1.0, proceed as specified below. If the degree of substitution of the pulp is less than or equal to 1.0, proceed as specified below, but use 6.4 mL (instead of 8.0 mL) of 30% NaOH solution and 2.9 g (instead of 3.6 g) of MCA. Slurry a 3 g (oven dried) sample of the pulp (fiberized) in 80 mL isopropanol. Add 8.0 mL of 30% NaOH solution over a 3 minute period. Stir the suspension for 1 hour at 20° C. Add 3.6 g of MCA (as 15.2 mL of a solution of 23.6 g MCA/100 mL isopropanol) over a 3 minute period. Raise the temperature to 55° C. in 25 minutes and continue stirring for 3.5 hours. Drain the resulting fibrous CMC and wash with 70% ethanol. Bring the sample to neutrality (pH 7.0) with acetic acid and then filter. Wash the filter cake again with 70% ethanol at 20° C. and filter. Repeat washing and filtering for one more wash with 70% ethanol at 20° C. and then for 3 more washes with 100% denatured ethanol at 20° C. Air dry the sample to 70-85% solids to form the resultant CMC. Test a 0.5% solution of the resultant CMC with a Brookfield viscometer using spindle 2 and 50 RPM at 20° C. according to ASTM method D2196-99 to determine resultant CMC viscosity. Test a 0.5% solution of the resultant CMC by US EPA method 180.1 to determine resultant CMC turbidity and a 0.013% solution of the resultant CMC by NCASI Method TB253 to determine resultant CMC color.

Starting Materials

Examples of suitable starting materials for making pulp in accordance with embodiments of the present technology include wood and recycled paper. In at least some embodiments, the starting material is never dried. In the wood pulping industry, trees are conventionally classified as either hardwood or softwood. Pulp for use as starting material can be derived from a softwood or hardwood tree species. Examples of suitable softwood tree species include fir (e.g., Douglas fir and balsam fir), pine (e.g., eastern white pine and loblolly pine), spruce (e.g., white spruce), larch (e.g., eastern larch), cedar, and hemlock (e.g., eastern and western hemlock). Examples of suitable hardwood species include acacia, alder (e.g., red alder and European black alder), aspen (e.g., quaking aspen), beech, birch, oak (e.g., white oak), gum trees (e.g., eucalyptus and sweetgum), poplar (e.g., balsam poplar, eastern cottonwood, black cottonwood, and yellow poplar), gmelina and maple (e.g., sugar maple, red maple, silver maple, and bigleaf maple).

Wood from softwood or hardwood species generally includes three major components: cellulose, hemicellulose, and lignin. Cellulose makes up about 50% of the woody structure of plants and is an unbranched polymer of D-glucose monomers. Individual cellulose polymer chains associate to form thicker microfibrils that, in turn, associate to form fibrils arranged into bundles. The bundles form fibers that are visible as components of the plant cell wall when viewed at high magnification under a light microscope or a scanning electron microscope. Cellulose is highly crystalline as a result of extensive intramolecular and intermolecular hydrogen bonding. Hemicellulose is a heterogeneous group of low molecular weight carbohydrate polymers such as xylan and mannan that are associated with cellulose in wood. Hemicelluloses are amorphous, branched polymers, in contrast to cellulose which is a linear polymer. Lignin is a complex aromatic polymer and comprises about 20% to 40% of wood where it occurs as an amorphous polymer.

Modified Kraft Process

In general, Kraft processing involves chemically digesting cellulosic feedstock (e.g., wood chips) at elevated temperature and pressure in white liquor, which is an aqueous solution of cooking chemicals (e.g., sodium sulfide and sodium hydroxide). The cooking chemicals dissolve lignin that binds together cellulose fibers within the feedstock. When this chemical digestion is complete, the pulp is transferred to an atmospheric tank known as a "blow tank." The contents of the blow tank are then sent to pulp washers, where the spent cooking chemicals are separated from the pulp. The pulp then proceeds through various stages of washing and bleaching, after which it is pressed and dried into a finished product.

The Kraft process is designed to recover the cooking chemicals and heat. For example, spent cooking chemicals and pulp wash water can be combined to form a weak black liquor that is concentrated in a multiple-effect evaporator system to about 55% solids. The black liquor can then be further concentrated to 65% solids in a direct-contact evaporator by bringing the liquor into contact with flue gases from a recovery furnace or in an indirect-contact concentrator. The strong black liquor can then be fired in a recovery furnace. Combustion of organics dissolved in the black liquor can provide heat for generating process steam and for converting sodium sulfate to sodium sulfide. Inorganic chemicals present in the black liquor may collect as a molten smelt at the bottom of the furnace. The smelt can be dissolved in water to form green liquor, which can then be transferred to a causticizing tank where quicklime (calcium oxide) can be added to convert the solution back to white liquor for return to the digester system. A lime mud precipitate from the causticizing tank can be calcined in a lime kiln to regenerate quicklime.

FIG. 1 is a flow chart illustrating a method 100 for making pulp in accordance with an embodiment of the present technology. In the illustrated embodiment, the method 100 is based on a Kraft process. In other embodiments, counterparts of the method 100 can be based on other suitable processes. With reference to FIG. 1, the method 100 can include a pulping process 102 and a post-pulping process 104. Within the pulping process 102, the method 100 can include loading chips (block 106) and pre-steaming the chips (block 108). Steam at atmospheric pressure can be used to preheat the chips and drive off air to enhance liquor penetration. After pre-steaming, the method 100 can include adding chemicals (e.g., NaOH, $Na_2S$, and/or other suitable chemicals) to the chips (block 110). For example, the chemicals can be added as a cooking liquor. The wood chips and cooking liquor can then be fed into a digester. Within the digester, the cooking liquor can be allowed to impregnate the wood chips (block 112). Good penetration of the cooking liquor can promote uniform cooking of the wood chips.

After impregnation, the method 100 can include cooking the wood chips and cooking liquor in co-current (block 114) and counter-current (block 116) liquid contact. In either operation, the cooking liquor and chips can be brought to temperature. Next, wash liquor can be introduced into the bottom of the digester such that it flows counter-currently to the cooked pulp (block 118). Cooking can end when the pulp encounters the cooler wash liquor. After digester washing, the digester contents can be blown (block 120). Digester blowing can involve releasing wood and liquor at atmospheric pressure. The release can occur with a sufficient amount of force to cause fiber separation. If desired, the blow tank can be equipped with heat recovery equipment to reduce operating expenses. Finally, the pulp can be sent from the blow tank to an external pulp washer for separation of black liquor from the pulp (block 122).

Following the pulping process 102, the pulp can be bleached and cellulose fibers within the pulp can be crosslinked. In a standard Kraft process, bleaching occurs without crosslinking. Bleaching typically does not cause a substantial reduction of the hemicellulose content of a pulp. Instead, bleaching involves removal of lignin with an attendant decrease in pulp fiber length and viscosity. During bleaching, pulp can be treated with various chemicals at different stages in a bleach plant. The stages can be carried out in vessels or towers of conventional design. Bleaching typically occurs as a sequence of operations, such as one or more bleaching stages with different bleaching agents (e.g. oxygen, chlorine dioxide, etc.), extraction stages, other treatment stages, and so forth. The bleaching sequence may be identified in terms of the order of the operations performed in the sequence. For example, one example of a bleaching sequence is O-D-E-D. Such a bleaching sequence includes an oxygen bleaching stage (an "O stage"), followed by a first chlorine dioxide bleaching stage (a "D stage"), followed by an extraction stage (an "E stage," or "EOP stage" in which bleaching chemicals such as peroxide ("P") and/or oxygen ("O") are mixed with caustic for removing lignin), and a second D stage. Several additional examples of bleaching processes are described in U.S. Pat. Nos. 6,331,354, and 6,605,350, which are incorporated herein by reference in their entireties.

The post-pulping process 104 can include first bleaching the pulp with oxygen (block 124). Bleaching pulp with oxygen tends to be less specific for the removal of lignin than bleaching pulp with chlorine dioxide. The oxygen bleaching can take place in an oxygen reactor under pressure. Suitable oxygen reactors and associated oxygen bleaching processes are described in U.S. Pat. Nos. 4,295,925, 4,295,926, 4,298,426, and 4,295,927, which are incorporated herein by reference in their entireties. The amount of oxygen added to the pulp can be within a range from 50 to 80 pounds per ton of pulp. The temperature during the oxygen bleaching can be within a range from 100° C. to 140° C.

After oxygen bleaching the pulp, the method 100 can include crosslinking cellulose fibers within the pulp (block 126). In at least some cases, this includes adding a crosslinker to the pulp and allowing a crosslinking reaction to occur before further processing the pulp. The crosslinker can be selected to form relatively strong crosslinks (e.g., ether crosslinks instead of ester or ionic crosslinks). Relatively strong crosslinks can be preferable to weaker crosslinks, for example, so that the crosslinks will be less likely to be disrupted by functionalizing reactions (e.g., etherification) used to form cellulose derivatives. The crosslinker can be added at a weight ratio relative to the pulp of greater than or equal to 2:100, greater than or equal to 3:100, greater than or equal to 5:100, or greater than or equal to another suitable lower threshold. The upper threshold can be a maximum amount of crosslinker that can be used without causing resultant CMC from the pulp to become insoluble in water. In at least some cases, a catalyst (e.g., NaOH, zinc tetrafluoroborate, $Zn(BF_4)_2$) is present during crosslinking. In addition or alternatively, a surfactant can be present during crosslinking, such as to promote crosslinker dispersion and penetration. A surfactant can be especially useful in conjunction with a hydrophobic crosslinker.

Suitable crosslinkers include ethers, such as glycidyl ethers having two or more glycidyl groups. For example, the crosslinker can include a first glycidyl group, a second glycidyl group, and either three or four linear chain carbon atoms between the first and second glycidyl groups. In addition or alternatively, the crosslinker can have weight average molecular weight less than or equal to 500 (e.g., within a range from 174 to 500). Furthermore, when the crosslinker is an epoxide, the crosslinker can have a weight per epoxide less than or equal to 175 (e.g., within a range from 140 to 175). The crosslinker can have a viscosity of less than or equal to 500 cP at 25° C. In at least some embodiments, the crosslinker is at least partially insoluble in water. This property can be useful, for example, to increase contact between the crosslinker and cellulose fibers during the crosslinking reaction. Specific examples of suitable crosslinkers include trimethylolethane triglycidyl ether, 1,4-butanediol diglycidyl ether, glycerol diglycidal ether, neopentyl glycol diglycidyl ether, glycerol polyglycidyl ether, glycerol triglycidyl ether, ethyleneglycol diglycidyl ether, and trimethylol propane triglycidyl ether, among others.

During crosslinking, the pulp can have a temperature within a range from 50° C. to 85° C. Furthermore, the pulp can have a pH within a range from 9 to 14. As discussed above, crosslinking while the consistency of the pulp is relatively high can be useful to increase the ability of the pulp to produce high-grade cellulose derivatives. The consistency of the pulp during all or a portion (e.g., at least 50% by time) of the crosslinking can be at least 12% (e.g., within a range from 12% to 30%) or at least 15% (e.g., within a range from 15% to 30%). For example, the consistency of the pulp can be increased (e.g., by pressing off water) before crosslinking. When further pulp processing is to occur after crosslinking, the consistency of the pulp can be decreased (e.g., by adding water) after crosslinking. Due to the relatively high consistency and/or other factors, the crosslinking can increase the reactivity (as measured by water retention value) and alkaline resistance (as measured by R18) of the pulp. In contrast, conventional crosslinking processes at least typically reduce or do not affect one or both of these desirable properties.

Crosslinking pulp in accordance with embodiments of the present technology can be used in combination with other techniques for increasing the ability of pulp to produce high-grade cellulose derivatives. For example, the cooking described above in the pulping process 102 can be relatively mild. With relatively mild cooking, less lignin may be removed from the pulp than would otherwise be the case. After mild cooking, the pulp may have a kappa number from 25-35 indicating the presence of significant residual lignin. As another example, the bleaching and extraction described below in the post-pulping process 104 can be relatively mild. Unlike modifying the Kraft process by adding strong caustic extraction and prehydrolysis, the aforementioned modifications to the Kraft process can incrementally improve the ability of Kraft pulp to produce high-grade cellulose derivatives without unduly compromising brightness, yield, and/or reactivity.

After crosslinking cellulose fibers within the pulp, the method 100 can include bleaching the pulp with chlorine dioxide a first time (block 128). Chlorine dioxide bleaching tends to be more selective than oxygen bleaching for removing lignin. The amount of chlorine dioxide added to the pulp can be within a range from 20 to 30 pounds per ton of pulp. The temperature during the first chlorine dioxide bleaching can be within a range from 50° C. to 85° C. After chlorine dioxide bleaching the pulp the first time, the method 100 can include extraction (block 130), to remove lignin from the pulp. The extraction can include adding hydrogen peroxide or another suitable caustic to the pulp. The amount of hydrogen peroxide added to the pulp can be within a range from 20 to 100 pounds per ton of pulp. The temperature during extraction can be within a range from 75° C. to 95° C. In contrast to strong caustic extraction for removing hemicellulose, extraction for removing lignin can be relatively mild. For example, the extraction can be one that does not change the crystal structure of the cellulose fibers.

With reference again to FIG. 1, after extraction, the method 100 can include bleaching the pulp with chlorine dioxide a second time (block 132). The amount of chlorine dioxide added to the pulp can be within a range from 10 to 30 pounds per ton of pulp. The temperature during the second chlorine dioxide bleaching can be within a range from 60° C. to 90° C. The method 100 can further include additional operations other than the operations specifically identified in FIG. 1. For example, after any of the operations in the post-pulping process 104, the method 100 can include washing the pulp. This can be useful, for example, to remove carryover and to increase pulp consistency. A washing operation can be used to increase the pulp consistency after oxygen bleaching the pulp and before crosslinking the pulp.

Although crosslinking in the illustrated embodiment occurs after oxygen bleaching and before the chlorine dioxide bleaching, in other embodiments, crosslinking can occur at another point in a counterpart of the post-pulping process 104 as described below. The bleaching and extraction operations can also be rearranged or removed in other embodiments. If "X" is defined as a crosslinking operation, post-pulping methods in accordance with several embodiments of the present technology can be characterized as: O-X-D-E-D (FIG. 1), O-D-X-E-D, O-D-E-X, O-D-E-X-D, O-D-E-D-X, D-X-E-D-E-D, D-E-X-D-E-D, D-E-D-X-E-D, D-E-D-E-X-D, D-E-D-E-D-X, D-X-E-E-D, D-E-X-E-D, D-E-E-X-D, or D-E-E-D-X, among numerous other suitable permutations. Furthermore, the crosslinking can occur during oxygen bleaching, chlorine dioxide bleaching, and/or extraction. Thus, post-pulping methods in accordance with several more embodiments of the present technology can be characterized as: O/X-D-E-D, O-D/X-E-D, O-D-E/X-D, O-D-E/X, O-D-E-D/X, D/X-E-D-E-D, D-E/X-D-E-D, D-E-D/X-E-D, D-E-D-E/X-D, D-E-D-E-D/X, D/X-E-E-D, D-E/X-E-D, D-E-E/X-D, D-E-E-D/X, among numerous other suitable permutations.

After the bleaching process 104, the method 100 can include processing the pulp for use, sale, and/or transport (block 134). For example, the pulp can be dried (e.g., flash dried), pressed, containerized, and/or otherwise processed to put the pulp into a suitable form (e.g., sheet, bale, roll, etc.) for use, sale, and/or transport. The pulp can have a basis weight from 500 to 1200 $g/m^2$ and/or a density of 0.2 to 0.9 $g/cm^3$. In some embodiments, the pulp of the method 100 is combined with another pulp before being dried. Pulps in accordance with at least some embodiments of the present technology are well suited for use as pulp extenders that reduce the amount of expensive dissolving grade pulp needed for producing a given cellulose derivative product without compromising the viscosity or other desirable properties of the product. For example, the pulp of the method 100 can be blended with another pulp (e.g., a dissolving grade pulp having a cellulose content greater than 90% by oven dried weight) such that the pulp of the method 100 makes up at least 20% (e.g., at least 30%) by cellulose oven-dried weight of a resulting blended pulp. In other embodiments, the pulp of the method 100 can be used without being blended with another pulp.

Crosslinked Pulp Properties

Pulp in accordance with embodiments of the present technology can have one or more of the following properties:

Basis weight greater than or equal to 500 $g/m^2$ and/or less than or equal to 1200 $g/m^2$.

Brightness greater than or equal to 75% (e.g., greater than or equal to 80% or 85%) and/or less than or equal to 92% (e.g., less than or equal to 88.5%). For example, the brightness can be within a range from 80% to 88%.

Cellulose-II structure negligible (e.g., at least substantially no cellulose-II structure) as determined by x-ray crystallography.

Crystallinity index less than or equal to 75% (e.g., less than or equal to 80%).

Cuen solubility less than complete (e.g., insoluble or only partially soluble).

Density greater than or equal to 0.20 $g/cm^3$ (e.g., greater than or equal to 0.50, 0.55 or 0.60 $g/cm^3$).

Falling ball viscosity greater than or equal to 200 cP (e.g., greater than or equal to 200, 300, 330, 500, 800, 1,000, 1,400, 2,000, or 3,000 cP). At very high degrees of crosslinking, the falling ball viscosity of crosslinked pulps in accordance with at least some embodiments of the present technology may be low, but the resultant CMC viscosity for these pulps may still be very high. Solely by way of theory, and without wishing to be bound to such theory, the molecular structure of the cellulose may change from linear to highly branched at high degrees of crosslinking. Cellulose having a highly branched structure may have a low falling ball viscosity, but still be capable of forming high-grade ether.

Freeness greater than or equal to 700 mL.

Hemicellulose content greater than or equal to 6% (e.g., greater than or equal to 10%, 13.5%, or 15.5%) and/or less than or equal to 20% (e.g., less than or equal to 18%, 16%, or 14%) by weight. For example, the hemicellulose content can be within a range from 6% to 20%, within a range from 7% to 17%, or within a range from 8 to 15% by weight.

Intrinsic viscosity greater than or equal to 1,150 mL/g (e.g., greater than or equal to 1,300, 1,400, 1,500, or 2,100 mL/g).

Lignin content less than or equal to 1.0% (e.g., less than or equal to 0.75% or 0.09%).

Mannan content greater than or equal to 4% (e.g., greater than or equal to 4%, 5%, 6%, or 7%). For example, the mannan content can be within a range from 4% to 8% or within a range from 5% to 7%.

R18 greater than or equal to 88% (e.g., greater than or equal to 89%) and/or less than or equal to 92% (e.g., less than or equal to 91% or 90%).

Resultant CMC color less than or equal to 5 (e.g., less than or equal to 3).

Resultant CMC turbidity less than or equal to 25 ntu (e.g., less than or equal to 5 or 0.5 ntu).

Resultant CMC viscosity greater than or equal to 59 cP (e.g., greater than or equal to 60, 90, 120, or 150 cP).

Total transition metal content less than or equal to 20 ppm. The iron content can be less than or equal to 5 ppm. The copper content can be less than or equal to 2 ppm. The calcium content can be less than or equal to 150 ppm (e.g., less than or equal to 60 ppm) and/or greater than or equal to 30 ppm (e.g., greater than or equal to 50 or 70 ppm). Transition metals are often undesirable in pulp because, for example, they can accelerate the degradation of cellulose in etherification processes.

Water retention value greater than or equal to 1.0 g/g (e.g., greater than or equal to 1.1, 1.2, or 1.3 g/g) and/or less than or equal to 1.4 g/g.

Xylan content greater than or equal to 4% (e.g., greater than or equal to 5%, 6%, or 7%) and/or less than or equal to 16%. For example, the xylan content can be within a range from 4% to 16%, within a range from 5% to 8%, or within a range from 6% to 7%.

EXAMPLES

The following experimental examples are provided to illustrate certain particular embodiments of the disclosure. It should be understood that additional embodiments not limited to the particular features described are consistent with the following experimental examples.

Referenced Commercial Products

9H4F: Aqualon 9H4F high-viscosity (DS=0.95) CMC from Ashland, Inc.

NB416: Never-dried, pine-derived, fluff-grade Kraft wood pulp obtained a Weyerhaeuser Company mill in New Bern, N.C.

NB421: Never-dried, pine-derived, ether-grade Kraft wood pulp obtained a Weyerhaeuser Company mill in New Bern, N.C.

PW416: Never-dried, pine-derived, fluff-grade Kraft wood pulp obtained a Weyerhaeuser Company mill in Port Wentworth, Ga.

Sulfite1 and Sulfite 2: Sulfite-processed, dissolving-grade, spruce-derived pulp from Borregaard ChemCell.

Experimental Example 1: Epoxide Crosslinked Pulps

The starting material for preparing crosslinked pulp in this example was PW416 pulp obtained from the extraction stage (EOP) as a 38% solids (after lab centrifugation) wet lap. The pulp was pre-warmed to 75° C. In a plastic bag, 52.6-gram never-dried (corresponding to 20-gram OD) samples of the pulp were mixed with warm water (75° C.), different crosslinkers, and NaOH (pH 11 to 13) at different pulp consistencies as shown in Tables 1 and 2. Tables 1 and 2 list the properties of the crosslinked pulp samples and the corresponding CMC. For comparison, uncrosslinked PW416 pulp from the EOP stage was found to have a resultant CMC viscosity of 42 cP.

The following polyepoxide crosslinkers were tested: GE-30 (trimethylol propane triglycidyl ether polymer (TMPTGE)) and GE-31 (trimethylol ethane triglycidyl ether polymer) from CVC Thermoset. Glycerol diglycidyl ether (GDE) from Aldrich. Denacol EX811 and EX810 (both ethyleneglycol diglycidyl ethers (EGDE)), Denacol EX313 (glycerol polyglycidyl ether (GPE)), Denacol EX314 (glycerol triglycidyl ether (GTE)), and EX612 (sorbitol polyglycidyl ether) from Nagase Chemitex. HELOXY modifier 505 (castor oil polyglycidyl ether (M505)), HELOXY modifier 48 (trimethylol propane triglycidyl ether, M48 (TMPTGE)), HELOXY modifier 67 (1,4-butanediol diglycidyl ether, M67 (BDDE)), and HELOXY modifier 68 (neopentyl glycol diglycidyl ether, M68) from Momentive. D.E.R. 736 Epoxy Resin (D736), polypropylene glycol, chloromethyloxirane polymer from Dow Chemical, diethylene glycol diglycidyl ether (DEGDE), 1,3-dichloro-2-hydroxypropanol (DCP), GPE, BDDE, EGDE, and TMPTGE from other suppliers.

TABLE 1

Different Crosslinkers and Crosslinking Conditions

| Crosslinker | | | | Crosslinking Condition | | | Crosslinked Pulp | |
|---|---|---|---|---|---|---|---|---|
| % used | Mn/water solubility | WPE | Viscosity (cP) | Pulp cons. (%) | NaOH (%) | Time (hr.) | Cuen soluble? | FB (cP) |
| 1% GE-30 | 302.4/NG | 135-150 | 100-200 | 10 | 2.0 | 2 | yes | 167 |
| 2% GE-30 | 302.4/NG | 135-150 | 100-200 | 10 | 2.0 | 2 | yes | 154 |
| 2% GE-30 | 302.4/NG | 135-150 | 100-200 | 20 | 2.3 | 2 | Not 100% | 517 |
| 2% GE-31 | 288.3/NG | 150-170 | 200-300 | 20 | 2.3 | 2 | Not 100% | 496 |
| 3.5% EX 313 | >204/partial | 141 | 150 | 20 | 2.5 | 2 | yes | 199 |
| 3.5% EX 314 | >204/partial | 144 | 170 | 20 | 2.5 | 2 | Not 100% | 333 |
| 3.5% EX 810 | ~174/soluble | 113 | 20 | 20 | 2.5 | 2 | Not 100% | 418 |
| 4.5% EX 810 | ~174/soluble | 113 | 20 | 18 | 2.5 | 2 | Not 100% | 810 |
| 3.5% EX 811 | ~174/partial | 132 | 20 | 20 | 2.5 | 2 | Not 100% | 188 |
| 4.5% EX 811 | ~174/partial | 132 | 20 | 18 | 2.5 | 2 | Not 100% | 800 |
| 3.5% M48 | 302.4/NG | 138-154 | 120-180 | 20 | 2.5 | 2 | Not 100% | 366 |
| 4.5% M48 | 302.4/NG | 138-154 | 120-180 | 18 | 2.5 | 2 | Not 100% | 905 |
| 4.5% M67 | 202.3/insol. | 123-147 | 20-30 | 18 | 2.5 | 2 | Not 100% | 916 |
| 4.5% M68 | 216.3/NG | 130-145 | 13-25 | 18 | 2.5 | 2 | Not 100% | 900 |
| 4.5% EGDE | ~174/partial | 129-139 | 15-25 | 18 | 2.5 | 2 | Not 100% | 880 |
| 5.5% EGDE | ~174/partial | 129-139 | 15-25 | 10 | 2.6 | 1 | yes | 375 |
| 5.0% GPE | >204/insol. | 143-154 | 100-200 | 18 | 2.5 | 2 | Not 100% | 503 |

TABLE 1-continued

Different Crosslinkers and Crosslinking Conditions

| 4.5% TMPTGE | 302.4/NG | 135-147 | 90-180 | 18 | 2.5 | 2 | Not 100% | 610 |
| 4.5% BDDE | 202/partial | 122-136 | 10-20 | 18 | 2.5 | 2 | Not 100% | 910 |
| 4.5% GDE | 204.2/NG | 102.11 | — | 18 | 2.5 | 2 | Not 100% | 1700 |
| 4.5% DCP | 129/soluble | — | — | 18 | 2.5 | 2 | Not 100% | 351 |
| 4.5% D736 | 246.3/partial | 175-205 | 30-60 | 18 | 2.5 | 2 | yes | 160 |
| 4.5% DEGDE | 218.3/soluble | ~110 | — | 18 | 2.5 | 2 | yes | 123 |
| 5.0% EX612 | 390/partial | 166 | 11900 | 18 | 2.5 | 2 | yes | 190 |
| 2.0% M505 | >933/NG | 500-650 | 250-500 | 20 | 2.3 | 2 | yes | 156 |

| | Crosslinker | | | Crosslinker condition | | | CMC properties |
|---|---|---|---|---|---|---|---|
| % used | Mn/water solubility | WPE | Viscosity (cP) | Pulp Cons. (%) | NaOH, (%) | Time (hr.) | Viscosity (cP) of 0.5% CMC Solution |
| 7.5% GPE | >204/insoluble | 143-154 | 100-200 | 11.8 | 2.0 | 1 | 113 |
| 7.5% EX314 | >204/partial | 144 | 170 | 11.8 | 2.0 | 1 | 95 |
| 7.5% EGDE | ~174/partial | 129-139 | 15-25 | 11.8 | 2.0 | 1 | 85 |
| 7.5% EX810 | ~174/soluble | 113 | 20 | 11.8 | 2.0 | 1 | 78 |
| 7.5% PEGDE | 526/soluble | 263 | — | 10 | 5.0 | 1 | 49 |

The results shown in Table 1 indicate that polyepoxides D736 (dipropyleneglycol diglycidyl ether), DEGDE (diethyleneglycol diglycidyl ether), EX612 (sorbitol polyglycidyl ether), M505 (castor oil polyglycidyl ether), PEGDE (poly(ethylene glycol) diglycidyl ether with Mn of 525) were not good candidates for crosslinking to produce pulp with high intrinsic viscosity. Their molecules have five or more than five linear chain atoms between two glycidyl ether function groups.

Among the tested crosslinkers having five or more than five linear chain atoms between two glycidyl ether function groups, DEGDE, PEGDE are highly soluble in water. D736 is partially soluble. EX612 and M505 have negligible solubility (NG) in water, but have high molecular weight (>500), high weight per epoxide (>175) and/or high viscosity (>500 cP). Thus, at least some polyepoxides with the following properties may be useful for crosslinking pulp in accordance with embodiments of the present technology: molecular weight less than or equal to 500, weight per epoxide less than or equal to 175, viscosity less than or equal to 500 cP, and molecular structures in which there are fewer than five linear chain carbon atoms between two glycidyl ether function groups.

The results also showed that crosslinkers well suited for producing crosslinked pulp with high resultant CMC viscosity had fewer than five linear chain atoms between two glycidyl ether function groups. By way of theory and not wishing to be bound by theory, these crosslinkers may penetrate the cellulose structure more readily than crosslinkers having longer chains.

It can be advantageous for crosslinkers to be insoluble or only partially soluble in water. Insoluble or only partially soluble crosslinkers, for example, may contact and react with cellulose fibers more readily than crosslinkers that are highly soluble in water. Polyepoxides with low or no water solubility produced better results than polyepoxides with greater water solubility. For example, GPE has almost the same structure as EX314 except the latter is modified to have higher water solubility; and EGDE has the same structure as EX810 except the latter is modified to have higher water solubility. Table 2 shows additional results using GPE (water insoluble: Mn>204, <500) with the EOP pulp (NB416 or PW416) at different consistencies. Intrinsic viscosity (IV*) was calculated from a model based on commercial samples having known intrinsic viscosities. Supporting data for the model can be found in the lower portion of Table 2. The resulting model was IV*=717.2 ln(A)−1817.3 ($R^2$=0.9988). The results shown in Table 2 indicate that higher crosslinking consistency will produce better results.

TABLE 2

Different Consistencies

| Starting Pulp | Pulp cons. (%) | FB visc. (mPa·s) | IV* (mL/g) | Pulp R18 (wt. %) | Pulp Xylan (wt. %) | Pulp Mannan (wt. %) | 0.5% CMC viscosity (cP) | Epoxide (%) | NaOH (%) |
|---|---|---|---|---|---|---|---|---|---|
| NB416 (control) | — | 263 | 922 | 86.7 | 8.5 | 6.2 | 45.6 | 0.0 | — |
| NB416 | 11.5 | 228 | 897 | 86.6 | 8.3 | 6.2 | 44.0 | 7.6 | 0 |
| NB416 | 10.0 | 2340 | 1514 | 89.4 | 8.6 | 6.3 | 104.0 | 7.5 | 5 |
| NB416* | 12.0 | 525 | 1622 | 90.4 | 8.5 | 6.3 | 121.0 | 7.5 | 5 |
| NB416 | 13.9 | 250 | 1823 | 91.2 | 8.4 | 6.2 | 160.0 | 7.5 | 5 |
| NB416** | 20.0 | insol. | 2160 | 92.8 | 8.4 | 6.3 | 256.0 | 7.5 | 5 |
| NB416 | 10.6 | 364 | 1311 | 88.4 | 8.5 | 6.2 | 78.4 | 3.8 | 5 |
| NB416 | 14.0 | 788 | 1402 | 89.2 | 8.6 | 6.3 | 89.0 | 3.8 | 5 |
| NB416 | 20.0 | 1480 | 1418 | 90.5 | 8.4 | 6.2 | 91.0 | 3.7 | 5 |
| PW416 (control) | — | 100 | 843 | 87.4 | 8.8 | 6.5 | 40.8 | — | — |

TABLE 2-continued

| | | | | Different Consistencies | | | | | |
|---|---|---|---|---|---|---|---|---|---|
| PW416 | 11.2 | 396 | 1110 | 90.1 | 8.8 | 6.6 | 59.2 | 7.7 | 5 |
| PW416 | 13.6 | 1000 | 1369 | 90.9 | 8.7 | 6.4 | 85.0 | 7.7 | 5 |

| Below: commercial samples used to calculate pulp IV from 0.5% CMC solution viscosity (A) | | | | | | | |
|---|---|---|---|---|---|---|---|
| Commercial Sample | Known IV | FB (mPa·s) | IV* (mL/g) | Pulp R18 (wt. %) | Pulp Xylan (wt. %) | Pulp Mannan (wt. %) | 0.5% CMC viscosity (cP) |
| NB421 | 910 | — | 922 | 87 | 8.2 | 6.2 | 45.6 |
| Sulfite1 | 1230 | 1180 | 1217 | 92.3 | 3.7 | 2.9 | 68.8 |
| Sulfite2 | 1435 | 2440 | 1426 | 94.9 | 3.3 | 1.7 | 92 |
| Cotton linter | 1795 | 11600 | 1805 | 99.5 | <1 | <1 | 156 |

*The corresponding crosslinked pulp is referred to elsewhere in this disclosure as "Kraft3"
**The corresponding crosslinked pulp is referred to elsewhere in this disclosure as "Kraft2"

Experimental Example 2: Bleached EGDE Crosslinked Pulp (O-D-E-X)

In this example, partially water soluble ethyleneglycol diglycidyl ether (EGDE) was used as the crosslinker. The starting material for preparing crosslinked pulp in this example was PW416 pulp obtained from the extraction stage as a 38.5% solids (after lab centrifugation) wet lap. 60-gram (OD) samples of the pulp were mixed with water, EGDE, and NaOH so the final concentrations of EGDE and NaOH were 8.8% and 4.8%, respectively, and the final pulp consistency was 10%. The pulp mixture was hand mixed for a few minutes, filtered to remove half the liquid and then reacted for 2 hr. at 75° C. Half of the resulting crosslinked pulp was thoroughly water washed and was then made into a sheet with basis weight of 747 g/m² and a density of 0.53 g/cm³. The sheet had a brightness of 79.3% and a falling ball viscosity of about 1,350 cP. The crosslinked pulp was not 100% soluble in cupriethylenediamine. CMC from the pulp had a 0.5% solution viscosity of 86 cP (Sample 1A in Table 5). The other half of the crosslinked pulp (not washed) was bleached with $H_2O_2$ (0.76% by dry pulp weight) at 76° C. for 30 minutes (Sample 1B in Table 5). This pulp was washed and made into a sheet with a basis weight of 746 g/m² and a density of 0.54 g/cm³. The pulp sheet had a brightness of 82.3% and a FB viscosity of 1,270 cP. CMC from the pulp had a 0.5% solution viscosity of 84 cP. Other properties are summarized in Table 5.

Experimental Example 3: Bleached GTE Crosslinked Pulp (O-D-E-X-D)

In this example, glycerol triglycidyl ether (GTE) was used as the crosslinker. The starting material for preparing crosslinked pulp in this example was NB416 pulp obtained from the extraction stage (NB416 EOP) as a 38.5% solids (after lab centrifugation) wet lap. 60-gram (oven dried) samples of the pulp were mixed with water, GTE and NaOH for crosslinking at 75° C. for one hour. The crosslinked pulp was then mixed with bleaching chemicals ($ClO_2$ or $H_2O_2$) for reaction at 75° C. for 45 minutes. Bleached samples had increased brightness (78% to 86%) and CMC viscosity (Table 3).

TABLE 3

| | | | Bleaching | | | | |
|---|---|---|---|---|---|---|---|
| Starting Pulp | Consistency % | Pulp Hemicellulose (wt. %) | Bleaching Agent | Brightness (%) | 0.5% CMC viscosity (cP) | Epoxide % | NaOH % |
| NB416 EOP (non-crosslinked control) | — | 14.7 | — | — | 45.6 | — | — |
| NB416 EOP (control) | 11.8 | 14.5 | — | 78.6 | 120.0 | 7.5 | 5.0 |
| NB416 | 11.8 | 14.8 | 0.5% $ClO_2$ | 86.3 | 94.9 | 7.5 | 5.0 |
| NB416 | 11.8 | 14.9 | 0.25% $ClO_2$ | 85.2 | 109.8 | 7.5 | 5.0 |
| NB416 | 11.8 | 14.8 | 0.5% $H_2O_2$ | 82.0 | 115.7 | 7.5 | 5.0 |
| NB416 | 11.8 | 14.5 | 1% $H_2O_2$ | 83.0 | 116.9 | 7.5 | 5.0 |

Experimental Example 4: Bleached EGDE Crosslinked Pulp (O-D-E-D-X)

In this example, ethyleneglycol diglycidyl ether (EGDE) was again used as the crosslinker. The starting material for preparing crosslinked pulp in this example was NB416 pulp obtained from the extraction stage as a 38.5% solids (after lab centrifugation) wet lap. 60-gram (oven dried) samples of this pulp were mixed with water, EGDE, and NaOH so the concentration of EGDE and NaOH were 11% and 5.4%, respectively, and the pulp had a consistency of 10%. The pulp mixture was hand mixed for a few minutes. Half of the liquid was filtered so the final concentration of EGDE and NaOH in the pulp were 4.9% and 2.7%, respectively, and the pulp consistency was 20%. The mixture was then reacted for 2 hr. at 80° C. The resulting crosslinked pulp was thoroughly water washed and a TAPPI handsheet was made with a basis weight of 65 g/m² and a density of 0.65 g/cm³. The sheet had a brightness of 87.8% and a falling ball viscosity of 2,710 cP. The pulp was not totally soluble in cupriethylenediamine. CMC from the pulp had a 0.5% solution viscosity of 126 cP (Sample 2A in Table 5). The other half of the wet crosslinked pulp was treated at 10% consistency with $H_2O_2$ (1% by dry pulp weight) and 0.5% NaOH (0.5% by dry pulp weight) at 75° C. for 1 hour. The bleached pulp was washed and a TAPPI handsheet was made with a basis weight of 65 g/m² and a density of 0.68 g/cm³. The crosslinked pulp had a falling ball viscosity of 283 cP and a brightness of 89.4%. CMC from the pulp had a 0.5% solution viscosity of 107 cP (Sample 2B in Table 5).

Experimental Example 5: Crosslinking Efficacy at Different Temperatures

The procedure from Experimental Example 4 was repeated to make more samples using EGDE as the crosslinker and with the final concentrations of EGDE and NaOH in pulp of about 4.9% and 2.7%, respectively. The pulp was crosslinked at a consistency of 20%. The crosslinked pulp was washed, but not bleached. The falling ball viscosity and CMC properties of the crosslinked pulp are summarized in Table 4 below (Samples A1-A7). All of the samples were not fully soluble in cupriethylenediamine. Large amounts of crosslinked pulp were not dissolved in cupriethylenediamine.

TABLE 4

Crosslinking Temperatures

| Sample | Temp. (° C.) | Crosslinker | Pulp FB visc. (mPa · s) | 0.5% CMC viscosity (cP) | IV* (mL/g) |
|---|---|---|---|---|---|
| A1 | 70 | EGDE | 2200 | 129 | 1668 |
| A2 | 75 | EGDE | 2680 | 177 | 1895 |
| A3 | 75 | EGDE | 1840 | 161 | 1827 |
| A4 | 80 | EGDE | 3010 | 95 | 1449 |
| A5 | 80 | EGDE | 3450 | 88 | 1394 |
| A6 | 80 | EGDE | 4190 | 90 | 1410 |
| A7 | 85 | EGDE | 760 | 70 | 1230 |
| Below: commercial non-crosslinked DWP and kraft pulp for comparison | | | | | |
| Sulfite 1 | — | — | 1180 | 68.8 | 1217 |
| Sulfite 2 | — | — | 2440 | 92 | 1426 |
| PW416 | — | — | 160 | 40 | 828 |
| NB421 | — | — | 242 | 46 | 929 |

For the crosslinked pulp listed in Table 4, pulp FB viscosity was not a good indicator of the corresponding CMC viscosity, especially at very high crosslinking densities. At very high crosslinking densities, crosslinked pulp actually showed low FB viscosity because the crosslinked pulp did not dissolve completely in cupriethylenediamine. The CMC solution viscosities from these very crosslinked pulps, however, was very high and the CMC solutions were clear. The intrinsic viscosities (IV*) for these pulps are listed in Table 4. The temperature impact for crosslinking efficacy was clear for the crosslinker tested. Other crosslinkers may have other optimal temperature ranges, such as 50° C. to 85° C.

For comparison, two commercial high viscosity dissolving ether grade pulps (Sulfite1 and Sulfite2) and two commercial Kraft pulps (PW416 and NB421) were made into CMC without first crosslinking the pulps. These pulps were soluble in cupriethylenediamine and their pulp FB viscosities were good indications of their CMC viscosities. CMC solutions from these commercial sulfite and Kraft pulps were clear, but the solution viscosities, especially for the CMC solution from the Kraft pulp, were relatively low. Samples 1A and 1B in Table 5 are described in Experimental Example 2 above. Samples 2A and 2B in Table 5 are described in Experimental Example 4 above. In addition to the data shown in Table 5, CMC from Sample 1B was found to have a lignin content of 0.2 wt. %. For comparison with the CMC data shown in Table 5, 9H4F was found to have a CMC color of 0.12, a 0.013% CMC turbidity of 0.12 ntu, and a 0.67% CMC turbidity of 1.1 ntu.

TABLE 5

Pulp and CMC Properties

| Sample | Pulp FB visc. (cP) | Pulp R18 (wt. %) | Pulp brightness | Pulp Xylan (wt. %) | Pulp Mannan (wt. %) | Pulp Lignin (wt. %) | CMC Color | 0.013% CMC Turb. (ntu) | 0.67% CMC Turb. (ntu) |
|---|---|---|---|---|---|---|---|---|---|
| 1A (see Example 2) | 1350 | 88.5 | 79.3 | 8.6 | 6.2 | 0.7 | 0.0 | 0.13 | 0.8 |
| 1B (see Example 2) | 1270 | 88.2 | 82.3 | 8.4 | 6.1 | 0.6 | 0.0 | 0.11 | 1.0 |
| 2A (see Example 4) | 2710 | 90.6 | 87.8 | 7.8 | 5.7 | 0.5 | — | — | 1.0 |
| 2B (see Example 4) | 283 | 90.3 | 89.4 | 7.7 | 5.7 | 0.3 | — | — | 1.3 |
| Below: commercial non-crosslinked DWP and Kraft pulp for comparison | | | | | | | | | |
| PW416 | 160 | 87.3 | 86.8 | 8.8 | 6.5 | 0.1 | 0.0 | 0.11 | 1.0 |
| NB421 | 242 | 87.5 | 86.5 | 8.5 | 6.5 | 0.6 | 0.0 | 0.10 | 0.8 |
| Sulfite1 | 1160 | 92.3 | 88.8 | 3.7 | 2.9 | 0.8 | 0.0 | 0.10 | 1.1 |
| Sulfite2 | 2440 | 94.9 | 90.3 | 3.3 | 1.7 | 0.4 | 0.0 | 0.11 | 1.1 |

Experimental Example 6: X-ray Diffraction of Pulp

X-ray diffraction scans were performed on high viscosity dissolving wood pulp, cotton linter pulp, commercial Kraft pulp (NB421), pulp from the extraction stage of a Kraft process, and corresponding crosslinked pulps in accordance with embodiments of the present technology. The crosslinked pulps were found to have the same cellulose-I crystalline structure as the starting pulps with peaks at greater than 15° and between 21.5° and 22.5°. The main peaks for the crosslinked pulp shifted slightly to higher diffraction angles (bleached pulp from 21.5° to 22.4°, extraction-stage pulp from 21.7° to 22.2°). Cellulose-II crystalline structure has a peak at 12.5° and between 20° and 21.5°. For cellulose-I, peaks at diffraction angles of 22° and 18° are crystalline and amorphous peaks, respectively. For cellulose-II, peaks at diffraction angles of 19° and 15° are crystalline and amorphous peaks, respectively. Table 6 summarizes the x-ray diffraction data.

TABLE 6

X-Ray Diffraction

| Sample | Species | Pulping Type | IV (mL/g) | Crystalline Structure | Crystallinity Index (%) | R18 (%) |
|---|---|---|---|---|---|---|
| 1A (see Example 2) | S Pine | Kraft | Not 100% soluble | I | 66 | 88.2 |
| 1B (see Example 2) | S Pine | Kraft | Not 100% soluble | I | 72 | 88.2 |
| Below: commercial non-crosslinked DWP and Kraft pulp for comparison | | | | | | |
| DWP | spruce | sulfite | 1230 | I | 80 | 92.3 |
| DWP | spruce | sulfite | 1435 | I | 81 | 94.9 |
| DWP | Cotton linter | Soda | 1795 | I | 88 | 99.5 |
| DWP | Cotton linter | Soda | 200 | I | 89 | 96.3 |
| NB421 | S Pine | Kraft | 890 | I | 75 | 87.5 |

Experimental Example 7: Freeness and Other Properties of Crosslinked Pulp

Kraft1 was prepared using the same procedure as Sample 1A in Experimental Example 2 except that the EGDE concentration was 4.6% and the NaOH concentration was 2.2%. The crosslinked pulp was tested for freeness and brightness. The results are listed in the Table 7. The crosslinked pulp had similar brightness and freeness, thus similar drainage, as the starting pulp.

TABLE 7

Pulp and CMC Properties

| Pulp | Brightness (%) | Freeness (mL) | Pulp FB viscosity (cP) | 0.5% CMC viscosity (cP) | CMC (DS: 1.1) properties | |
|---|---|---|---|---|---|---|
| | | | | | Free Swell Capacity (g/g) | Centrifugal Capacity (g/g) |
| Kraft1 | 86.6 | 770 | 2640 | 140 | 14.9 | 13.7 |
| Below: commercial non-crosslinked DWP and Kraft pulp for comparison | | | | | | |
| Sulfite2 | 90.3 | ~700 | 2440 | 92 | 11.8 | 13.3 |
| NB421 | 86.5 | 746 | 242 | 46 | 11.7 | 9.5 |

CMC from the crosslinked Kraft pulp also had higher free swell and centrifugal capacities than commercial uncrosslinked ether grade pulp from a sulfite process (Sulfite2) or a Kraft process (NB421).

Experimental Example 8: WRV, Wet Bulk, and Other Properties of Crosslinked Pulp

More samples of crosslinked pulp were tested for wet bulk and other properties. The results of this testing are shown in Table 8. The tested samples were based on samples described in European Patent Application Publication No. 0399564 (Sample 1) and U.S. Pat. No. 8,722,797 (Sample 2), which are incorporated herein by reference in their entireties. Sample 1 is 1,3-dichloro-2-hydroxypropanol (DCP) crosslinked Kraft pulp. Sample 2 is polycarboxylic acid crosslinked Kraft pulp.

KraftA was prepared in the same procedure as Sample 1A in Experimental Example 2 except that the pulp consistency was 16%, the EGDE concentration was 4.6% relative to pulp dry weight, and the NaOH concentration was 2.2%. The wet bulk and capacity of the Kraft1 pulp were lower than those of Samples 1 and 2 and similar to those of regular fluff pulp (NB416). The Kraft1 pulp, however, produced much higher CMC solution viscosity than both regular fluff pulp and Sample 1. Sample 2 had lower R18 than the uncrosslinked control pulp due to breaking of the relatively weak ester crosslinks. The Kraft1 sample and Sample1 had higher R18 than the uncrosslinked control pulp because the ether crosslinks were relatively stable in the R18 testing process. Sample 1 was overly crosslinked and therefore unsuitable for producing cellulose ether.

TABLE 8

Pulp and Resultant CMC Properties

| Sample | Ash (%) | Pulp WRV (g/g) | Pulp FB Visc. (cP) | Carboxyl Content (meq/100 g) | Bond | Wet Bulk (0.6 kPa (cc/g)) | R18 (wt. %) | 0.5% CMC viscosity (cP) | 0.5% CMC Turb. (cP) |
|---|---|---|---|---|---|---|---|---|---|
| NB416 (control) | 0.09 | 1.08 | 196 | 3.2 | — | 11.97 | 87.4 | 45 | 0.8 |
| KraftA | — | 1.35 | — | — | ether | — | — | 435 | 3.6 |
| Kraft1 (see Example 7) | 0.16 | 1.30 | 2640 | 4.7 | ether | 11.43 | 89.9 | 161 | 1.0 |
| Kraft2 (see footnote in Table 2) | — | 1.23 | — | — | ether | — | 92.8 | 256 | 2.0 |
| Kraft3 (see footnote in Table 2) | — | 1.09 | 525 | — | ether | — | 90.4 | 121 | 1.0 |

TABLE 8-continued

| | | | | | Pulp and Resultant CMC Properties | | | | |
|---|---|---|---|---|---|---|---|---|---|
| Sample | Ash (%) | Pulp WRV (g/g) | Pulp FB Visc. (cP) | Carboxyl Content (meq/100 g) | Bond | Wet Bulk (0.6 kPa (cc/g)) | R18 (wt. %) | 0.5% CMC viscosity (cP) | 0.5% CMC Turb. (cP) |
| Sample 1 | 0.16 | 0.70 | insoluble | 3.7 | ether | 14.29 | 99.0 | 30 | — |
| Sample 2 | 0.95 | 0.36 | insoluble | 19.0 | ester | 14.19 | 86.6 | unstable | 31 |

Experimental Example 9: HPLC Spectrum for Hydrolyzed Crosslinked Pulp

KraftA from Experimental Example 8 was hydrolyzed for HPLC testing. A new sugar peak was observed indicating crosslinking between cellulose fibers in the sample.

Experimental Example 10: Metals in Crosslinked Pulp and DCM Extraction Residue

Additional samples were prepared using the procedure of Experimental Example 4, except that the final crosslinker and NaOH concentrations were 4.7% and 2.6%, respectively. The consistency was 19% and the temperature was 75° C. Reaction times are listed in Table 9. After washing the pulp, the metal content, falling ball viscosity, and resultant CMC viscosity were tested.

TABLE 9

| | | | | | | Pulp and Resultant CMC Properties | |
|---|---|---|---|---|---|---|---|
| Crosslinker Time (hr.) | Ca (ppm) | Cu (ppm) | Fe (ppm) | Na (ppm) | Mg (ppm) | Pulp FB viscosity (cP) | 0.5% CMC viscosity (cP) |
| 1 | 120 | 2.5 | 1 | 490 | 20 | 3180 | 210 |
| 1.5 | 90 | 0.6 | <1 | 470 | 20 | 4190 | 161 |
| 2 | 60 | 0.5 | 1 | 270 | 10 | 3450 | 177 |

Low calcium content and low transition metal content may be important for certain end uses. DCM residue from the crosslinked pulp was also tested. The crosslinked pulp was found to have extractive of less than 0.01%. Normal bleached pulp without crosslinking also had DCM extractive of less than 0.01%. IR spectra for the residue did not show any crosslinker.

Experimental Example 11: Fiber Morphology

Scanning electron microscopy analysis of crosslinked pulp showed earlywood pine. The fiber analysis showed that crosslinking changed the fiber morphology. Coarseness, curl, and kink index of the crosslinked pulp increased with crosslinking consistency (Table 10). Higher coarseness, curl, and kink may be desirable, such as for increasing fiber accessibility during derivatization reactions.

TABLE 10

| | | | Fiber Analysis | | | |
|---|---|---|---|---|---|---|
| Solid (wt %) | Cross-linker | 0.5% CMC viscosity (cP) | Coarse-ness (mg/100 m) | Curl Index | Kink Angle (Deg/mm) | Kink Index (1/mm) |
| Control | — | 46 | 23.5 | 0.202 | 72 | 2 |
| 11.5 | EGDE* | 44 | 22.9 | 0.236 | 84 | 2.4 |
| 10 | EGDE | 104 | 24.7 | 0.261 | 96 | 2.6 |
| 13.9 | EGDE | 160 | 27.1 | 0.292 | 105 | 2.8 |
| 20 | EGDE | 256 | 28.9 | 0.341 | 115 | 3.2 |
| 10.6 | EGDE | 78.4 | 23.1 | 0.221 | 77 | 2.2 |
| 14 | EGDE | 89 | 24.5 | 0.264 | 92 | 2.6 |
| 20 | EGDE | 97 | 23.9 | 0.299 | 104 | 2.9 |

*No catalyst (NaOH), see Table 3 for other conditions.

Experimental Example 12: Process to Prepare Crosslinked Cellulose

PW416 pulp was obtained from the extraction stage as a 38% solids (after lab centrifugation) wet lap. 20-gram (OD) samples of this pulp were pre-warmed to 80° C. and mixed in a plastic bag with warm water (80° C.), crosslinkers, and NaOH so the final concentrations of crosslinkers and NaOH were 2.0% and 2.3%, respectively. The pulp consistency was 10, 15 and 20% to produce samples L, M and N. All of the crosslinking mixtures had a pH greater than 11. Crosslinking was allowed to occur for 2 hours.

NB421 pulp from couch trim (fully-bleached, never-dried) was obtained as a 32.8% solids wet lap. This pulp was used to prepare samples O, P and Q. The same procedure described above for samples L, M and N was used and samples O, P and Q had corresponding consistencies of 10, 15, and 20%, respectively. Sample R had a crosslinking temperature of 60° C. The properties of these samples are shown in Table 11 along with those of a control pulp from a mill production. Crosslinking was allowed to occur for 2 hours. 0.67% CMC and 1.33% CMC viscosities are shown in Table 11 whereas elsewhere in this disclosure, 0.5% CMC viscosities are provided.

TABLE 11

DCP Crosslinked Pulp

| Sample | Solid (wt. %) | DCP (wt. %) | NaOH (wt. %) | FB (cP) | Cuen solubility | 0.67% CMC viscosity (cP) | 1.33% CMC viscosity (cP) |
|---|---|---|---|---|---|---|---|
| L | 10 | 2.0 | 2.3 | 244 | almost | 64 | 380 |
| M | 15 | 2.0 | 2.3 | 387 | almost | 104 | 570 |
| N | 20 | 2.0 | 2.3 | 1410 | low | 160 | 900 |
| O | 10 | 2.0 | 2.3 | 324 | 100% | 76 | 392 |
| P | 15 | 2.0 | 2.3 | 465 | almost | 120 | 664 |
| Q | 20 | 2.0 | 2.3 | 1240 | low | 140 | 900 |
| R | 20 | 2.5 | 2.6 | 1176 | low | — | — |
| Below: commercial non-crosslinked Kraft pulp for comparison ||||||||
| NB421 | — | 0% | — | 242 | 100% | 88 | 528 |

Under certain conditions (e.g., 15 to 20% pulp consistency), crosslinked Kraft pulp may have much higher (e.g., greater than 100% higher) falling ball viscosity than the starting pulp. These crosslinked Kraft pulps were not 100% soluble in Cuen. But, surprisingly, these crosslinked pulps were found to generate water soluble CMC solutions that were clear and had higher viscosities than CMC solutions produced from NB421 Kraft pulp with falling ball viscosity of 242 cP. The crosslinked pulps did not undergo extraction and, therefore, had high hemicellulose content and cellulose-I crystal structure like standard Kraft pulp. Crosslinked bleached Kraft pulp had high brightness. Crosslinked pulp from the extraction stage also had high brightness. It can be advantageous for crosslinking to be performed at high pulp consistency (e.g., 11 to 30%), with pH from 9 to 14, and a temperature from 50 to 85° C.

Experimental Example 13: Pulp Intrinsic Viscosity and Resultant CMC Shear Rate

Three control pulps (Sulfite1, Sulfite2, and Cotton Linters), one commercial pulp (Aqualon 9H4F from Ashland Company), and two crosslinked Kraft pulps (KraftA and KraftB which was prepared as Kraft2 in table 2 except the consistency was 17%) were used to form 1% and 0.5% CMC solutions. The intrinsic viscosities of the CMC solutions from these pulps under different shear rates are shown in Table 12.

TABLE 12

Pulp Intrinsic Viscosity and Resultant CMC Shear Rate

| | | Spindle (5) RPM (1% CMC solution) | | | | | Spindle (2) RPM (0.5% CMC solution) | | | | |
|---|---|---|---|---|---|---|---|---|---|---|---|
| Sample | SCAN IV | 5 | 10 | 20 | 50 | 100 | 5 | 10 | 20 | 50 | 100 |
| KraftB | — | 1140 | 1216 | 1140 | 927 | 741 | 190 | 219 | 217 | 196 | 176 |
| KraftA | — | 3572 | 2964 | 2413 | 1710 | 1302 | 676 | 608 | 527 | 413 | 337 |
| Below: commercial non-crosslinked DWP for comparison |||||||||||| 
| Sulfite1 | 1230 | 0 | 0 | 0 | 137 | 182 | 0 | 27 | 38 | 69 | 87 |
| Sulfite2 | 1435 | 0 | 0 | 152 | 247 | 281 | 0 | 59 | 74 | 92 | 109 |
| Cotton Linters | 1795 | 0 | 532 | 722 | 732 | 670 | 86 | 124 | 144 | 154 | 156 |
| Below: commercial CMC for comparison ||||||||||||
| 9H4F | — | — | 480 | 660 | 670 | 600 | 130 | 160 | 174 | 175 | 170 |

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

What is claimed is:

1. A method, comprising:
   bleaching a pulp comprising cellulose fibers;
   crosslinking the cellulose fibers within the pulp while the pulp has a consistency greater than or equal to 12%; and
   drying the pulp after bleaching the pulp and after crosslinking the cellulose fibers, wherein the dried pulp has:
   a resultant carboxymethyl cellulose viscosity greater than or equal to 60 centipoise,
   a brightness greater than or equal to 75%, and
   a water retention value greater than or equal to 1.1 g/g.

2. The method of claim 1, wherein crosslinking the cellulose fibers includes crosslinking the cellulose fibers while the pulp has a consistency greater than or equal to 15%.

3. The method of claim 1, wherein crosslinking the cellulose fibers includes increasing a water retention value of the pulp by crosslinking the crosslinking the cellulose fibers.

4. The method of claim 1, wherein crosslinking the cellulose fibers includes exposing the cellulose fibers to a glycidyl ether crosslinker having two or more glycidyl groups.

5. The method of claim 1, wherein crosslinking the cellulose fibers includes exposing the cellulose fibers to a crosslinker, and wherein the crosslinker has a weight average molecular weight within a range from 174 to 500.

6. The method of claim 1, wherein crosslinking the cellulose fibers includes exposing the cellulose fibers to a crosslinker, and wherein the crosslinker has a molecular weight per epoxide within a range from 140 to 175.

7. The method of claim 1, wherein crosslinking the cellulose fibers includes exposing the cellulose fibers to a crosslinker, and wherein the crosslinker includes a first glycidyl group, a second glycidyl group, and either three or four linear chain carbon atoms between the first and second glycidyl groups.

8. The method of claim 1, further comprising blending the pulp with a dissolving grade pulp having a cellulose content greater than 90% by oven dried weight to form a blended pulp after crosslinking the cellulose fibers, wherein drying the pulp includes drying the blended pulp.

9. The method of claim 1, wherein bleaching the pulp includes bleaching a Kraft pulp.

10. The method of claim 1, wherein bleaching the pulp includes oxygen bleaching the pulp.

11. The method of claim 1, wherein bleaching the pulp includes chlorine dioxide bleaching the pulp after oxygen bleaching the pulp.

12. The method of claim 1, wherein bleaching the pulp includes increasing a brightness of the pulp to a brightness greater than or equal to 75%.

13. The method of claim 1, wherein bleaching the pulp includes reducing a lignin content of the pulp to less than or equal to 0.09% by oven-dried weight of the crosslinked cellulose fibers.

* * * * *

UNITED STATES PATENT AND TRADEMARK OFFICE
CERTIFICATE OF CORRECTION

PATENT NO. : 10,428,459 B2
APPLICATION NO. : 15/909848
DATED : October 1, 2019
INVENTOR(S) : M. Luo It is certified that error appears in the above-identified patent and that said Letters Patent is hereby corrected as shown below:

In the Claims

| Column | Line | Error |
|---|---|---|
| 25 (Claim 3, Line 3) | 18 | "crosslinking the crosslinking the" should read --crosslinking the-- |

Signed and Sealed this
Seventh Day of April, 2020

Andrei Iancu
*Director of the United States Patent and Trademark Office*